May 24, 1938.  F. A. RICE  2,118,230
PERFORATING PENCIL
Filed May 18, 1933    3 Sheets-Sheet 1

Inventor
Fred A. Rice,
By Clarence A. O'Brien
Attorney

May 24, 1938.  F. A. RICE  2,118,230
PERFORATING PENCIL
Filed May 18, 1933  3 Sheets-Sheet 2

Inventor
Fred A. Rice,
By Clarence A. O'Brien
Attorney

May 24, 1938.  F. A. RICE  2,118,230
PERFORATING PENCIL
Filed May 18, 1933  3 Sheets-Sheet 3
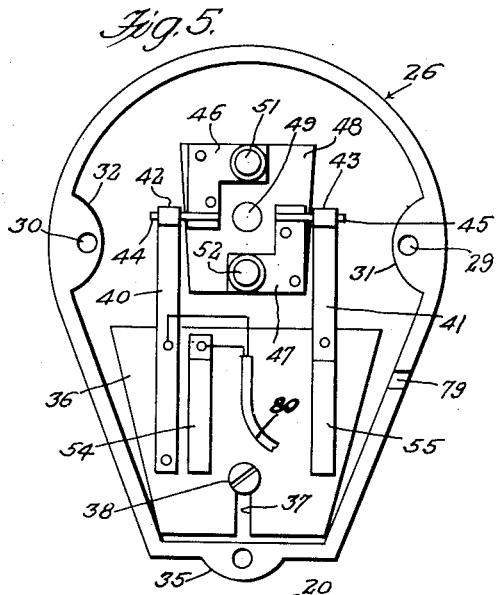
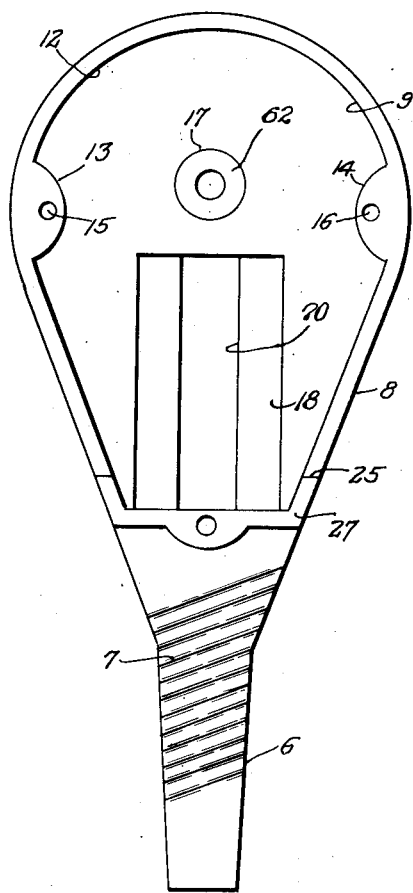
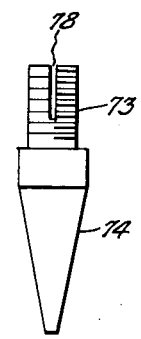
Inventor
Fred A. Rice,
By Clarence A. O'Brien
Attorney Patented May 24, 1938

2,118,230

UNITED STATES PATENT OFFICE 2,118,230

PERFORATING PENCIL

Fred A. Rice, Joliet, Ill.

Application May 18, 1933, Serial No. 671,774

3 Claims. (Cl. 164—89.5)

My invention relates to a perforating pencil, and an important object of my invention is to provide a perforating pencil of the self-contained powered type, which is formed of a small number of simple parts, so that it is efficient and is capable of being manufactured at low cost.

It is also an important object of my invention to make a device of the kind described as compact as efficiency of operation will permit, so that the same may be manipulated in a manner which makes fine and delicate work easily performed, including ruling therewith to a straight-edge.

Other objects and advantages of my invention will be apparent from a reading of the following description in connection with the drawings, wherein for purposes of illustration I have shown a preferred embodiment of my invention.

In the drawings:—

Figure 4 is a front elevational view showing both the cover and the motor removed.

Figure 5 is an elevational view of the interior of the cover member.

Figure 6 is a transverse vertical sectional view through the upper part of the device disclosing the arrangement of parts of the interior mechanism.

Figure 7 is a transverse vertical sectional view through the lower part of the embodiment.

Figure 8 is a side elevational view of the tip.

Figure 10 is a view of one of the contact and supporting springs.

Figure 1:
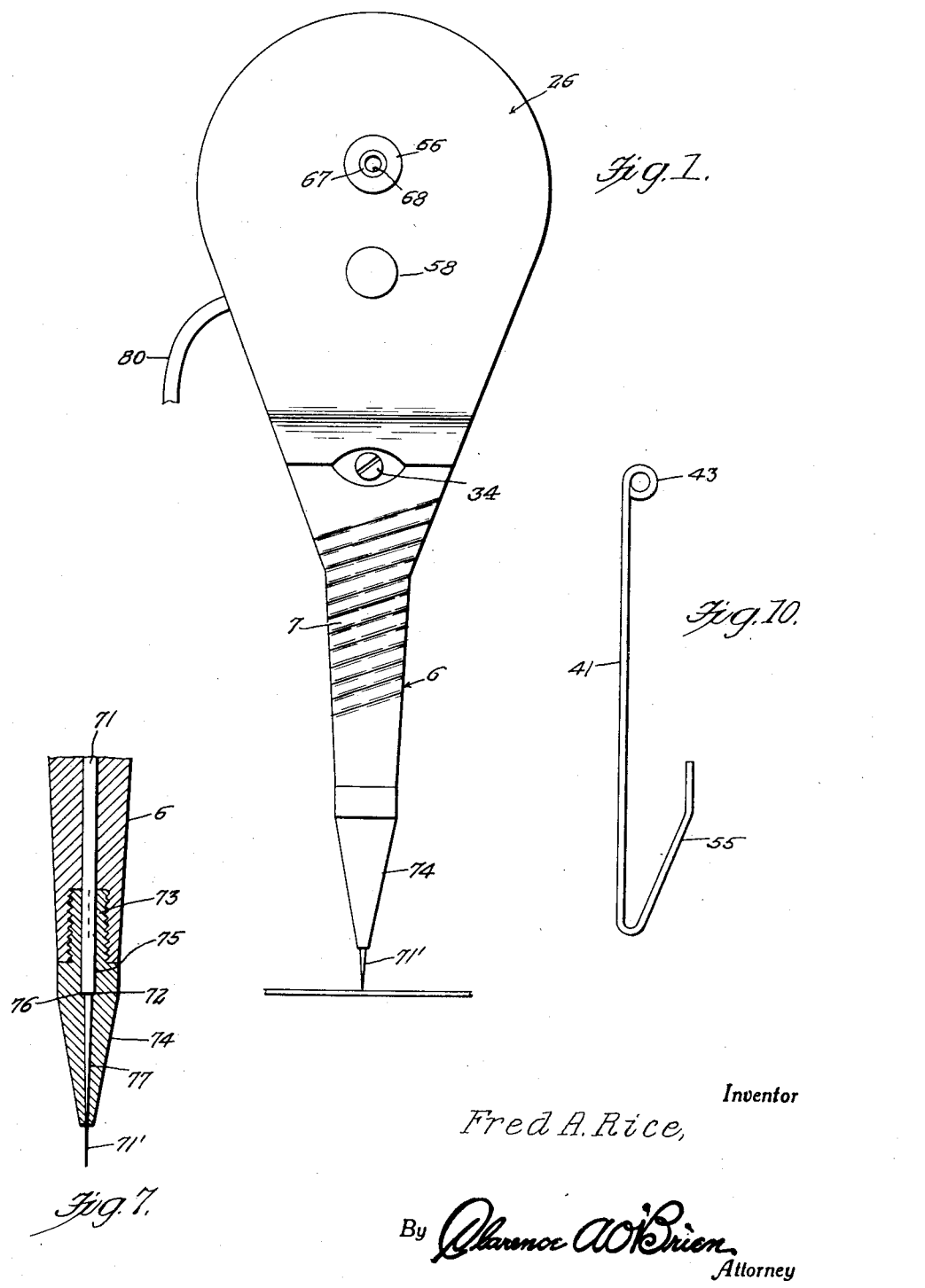
Figure 1 is a front elevational view of the embodiment.
Figure 2:
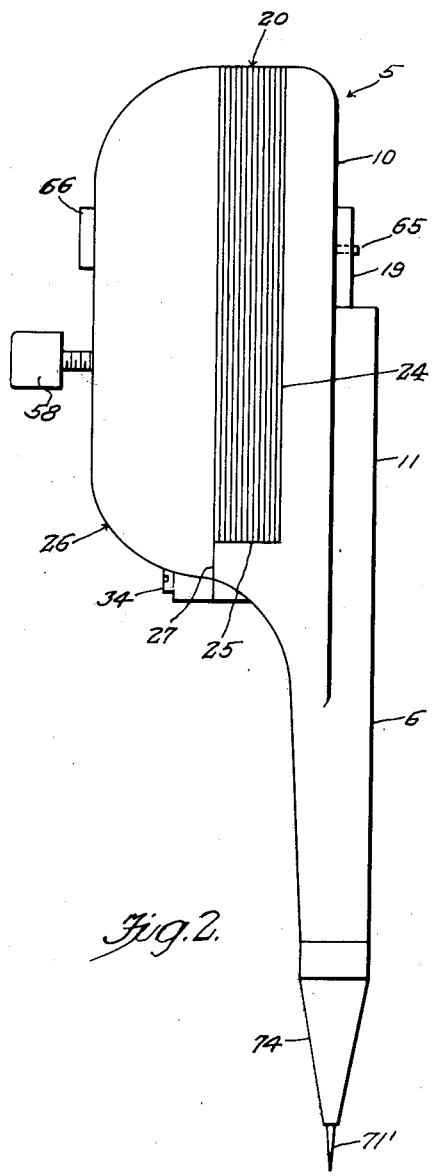
Figure 2 is a side elevational view thereof.

Referring in detail to the drawings the numeral 5 refers generally to the embodiment which comprises the upwardly tapering shank 6 which is provided on its front side with ribs or grooves 7. The upper part of the shank 6 tapers upwardly and merges into the main body of the device indicated at 8 which is pear-shaped. The front face of the main body portion 8 is hollowed out as indicated at 9 to constitute a portion of the motor housing. As indicated in Figures 2 and 6, the back 10 of the upper part of the main body portion is flat and has projecting therefrom the semi-cylindrical upper portion 11 of the shank 6. The upper part of the main body portion is semi-circular as indicated at 12 and provided with interior lugs 13, 14 provided with bolt holes 15, 16 for receiving the assembling bolts. Approximately concentric with the semi-circular portion 12 of the main body portion 8 is a shaft opening 17 and spaced below it is a vertically elongated opening 18 which communicates with the interior 70 of the upper portion 11 of the shank 6.

Figure 3:
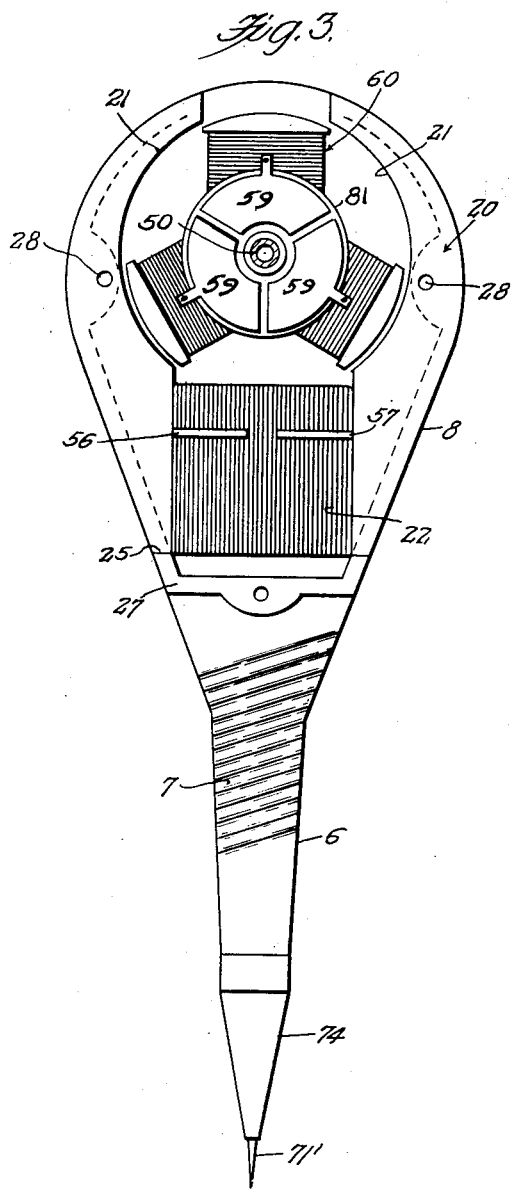
Figure 3 is a front elevational view showing the cover member removed.
Figure 9:
Figure 9 is an end elevational view of a portion of the shaft showing the eccentric pin.

Having a shape corresponding to that of the main body portion is the field magnet structure generally designated 20, the form of which is especially well shown in Figure 3. The field is laminated, being made up of a suitable number of plates of magnetically permeable metal. Portions of the arms of the magnets are formed semi-circular as indicated at 21, 21, while the bight portion between the arms of the magnets is wound as indicated at 22 with a suitable number of turns of insulated wire of suitable gauge. It is important to note that the front face of the upper part of the main body portion 8 is set back as indicated at 24 in Figure 2 so that a shoulder 25 is formed which is of a width equal to the width of the field 20, so that the cover member generally designated 26 can be attached to the front face 27 of the main body portion and to the front face of the field by appropriate bolts which pass through openings 28 in the field, see Figure 3, and into the openings 15, 16 in the main body portion already referred to.

The cover member 26 comprises a rather deep hollow form shown to advantage in Figures 5 and 6, which is of an outline and form similar to the upper part of the main body portion 8. This is secured in position by bolts passing through holes 29, 30 in interior lugs 31, 32 corresponding to the lugs 13, 14. Another screw or bolt 34 is passed through a lower lug 35 into the shoulder 25 of the main body portion.

Supported within the cover member 26 is a dielectric plate 36 which is slotted in its lower end as indicated at 37 to fit over a headed screw 38 which is anchored in the lower part of the cover member. The slotted lower end portion of the plate 36 is angular as indicated at 39 to rest upon the angular lower portion of the cover member as shown in Figure 6. Mounted on the plate 36 at one side of the slot 37 is a brass spring 40 and on the opposite side in a similar position another brass spring 41.

The upper ends of the springs 40, 41 are provided with journals 42, 43 formed by turning them over to embrace the axles or pins 44, 45 which are connected to brush mounting plates 46, 47.

The brush mounting plates 46, 47 are connected to a dielectric plate 48 which has an opening 49 receiving the rotatable shaft 50. Each of the plates 46, 47 carries a carbon brush 51, 52. Secured to the dielectric plate 36 between the spring arms 40, 41 is a third spring arm 54, and a second similar short spring arm 55 is located on the lower end of the spring arm 41 see Figure 10. The short arms 54, 55 are arranged to engage contact bars 56, 57 which lead from the opposite ends of the winding 22 of the field magnet.

Passing threadedly through the front of the cover member is an adjusting screw 58 whose inner end is arranged to engage the back of the dielectric plate 36 so that the brushes 51, 52 may be caused to move into or out of engagement with the three flat segments 59 carried by the adjacent face of the rotor 60 by adjusting the screw 58, whereby the rotor may be caused to rotate at different speeds. The segments 59 form the commutator of the rotor in a conventional arrangement.

The rotor 60 comprises the tri-polar electromagnet mounted on the rotatable shaft 50. Supporting the rear end of the shaft 50, which has a thrust collar or flange 61 thereon, is a bronze bushing 62 fitting in the opening 17 and which has a lubricant passage 63 joining a lubricant passage 64 in the back wall of the main body portion. The rear end of the shaft has an eccentric pin 65 thereon for connection with the perforating slide 19. The front end of the shaft is rotatably mounted in a bronze bushing 66 which contains interiorly a thrust bearing 67 engaging the front end of the shaft, the front end of the shaft being provided with an axial opening 68 and a lateral passage 69 for receiving and conveying lubricant.

Vertically slidable in the interior 70 of the shank 6, that is, in the upper portion 11 thereof is a squared slide 19 whose upper end is pivoted on the pin 65 on the back end of the shaft 50. Extending from the lower end of the slide 19 is the perforating shaft 71 which may extend beyond the lower end of the shank 6 as indicated at 72.

Into the lower end of the shank 6, as shown in Figure 7, is threaded a bit 73 on the tip 74. The tip 74 is provided with an upper enlarged bore 75, the lower part of this bore extending through the lower end of the tip 74 being reduced in diameter and downwardly tapered as indicated at 77, and the lower end extremity of the shaft 71 is similarly reduced in diameter and similarly tapered, so that on its down stroke, the travel of the shaft 71 is positively limited and guided in a predetermined manner, the contacting surfaces being so arranged that no jamming or wedging takes place.

By reason of the arrangement described and shown in Figure 7, chattering of the perforating end 71' of the needle or shaft 71 is prevented, as well as a too great penetration of the tracing point into the work. In this way a smaller needle is made practical, and staggering of perforations in the work prevented.

It will be obvious that as the adjusting screw 58 is turned inwardly it will increase the pressure of the brushes against the commutator of the electro-magnetic rotor thereby producing a better electrical engagement, and increasing the speed of operation of the rotor and hence of the needle. Assembling the cover member 26 to the main body portion positions the spring arms 54, 55 of the cover member into electrical engagement with the field coil outlets 56, 57.

The bit portion 73 of the tip 74 is slotted as indicated at 78 to provide the proper frictional engagement of the parts. It will also be observed that the cover member 26 has a notch 79 in one side edge to provide an opening for leading out of the casing the necessary electrical conductors 80 for connection with a suitable reduction transformer which is energized from a commercial or house current supply.

It will be observed that the commutator of the rotor has the segments 59 mounted on a plain dielectric disk 81 surrounding the shaft 50 and secured in a suitable manner to the rotor.

Although I have shown and described herein a preferred embodiment of my invention, it is to be definitely understood that I do not desire to limit the application of the invention thereto, and any change or changes may be made in material and structure and arrangement of parts, within the spirit of the invention and the scope of the subjoined claims.

What is claimed is:—

1. A perforating pencil comprising a body having a tubular shank terminating in a tip, said tip having the lower part of its bore tapering downwardly to the lower end of the tip, a needle passing through the shank and having a downwardly tapering lower end passing through the tapered part of the bore of the tip and means for reciprocating the needle.

2. A perforating pencil comprising a body part provided with a tubular shank terminating in a tip also of tubular construction, the bore of the tip having a reduced lower portion which forms a shoulder with the upper portion, said lower portion tapering downwardly to the lower end of the tip, a needle located in the shank and tip and having a reduced lower part forming a shoulder at its junction with the upper part, the reduced part tapering downwardly and located in the tapered part of the bore of the tip and means for reciprocating the needle.

3. A perforating pencil comprising a body part provided with a tubular shank terminating in a tip also of tubular construction, the bore of the tip having a reduced lower portion which forms a shoulder with the upper portion, said lower portion tapering downwardly to the lower end of the tip, a needle located in the shank and tip and having a reduced lower part forming a shoulder at its junction with the upper part, the reduced part tapering downwardly and located in the tapered part of the bore of the tip and means for reciprocating the needle, said means including a shaft rotatably supported in the body and having an eccentric pin at one end thereof, and a slide connected with the upper end of the needle and having a hole therein for receiving the pin.

FRED A. RICE.